April 14, 1959 P. ZENCZAK 2,882,331
BATTERY SEPARATOR AND PROCESS OF MAKING THE SAME
Filed Dec. 27, 1955
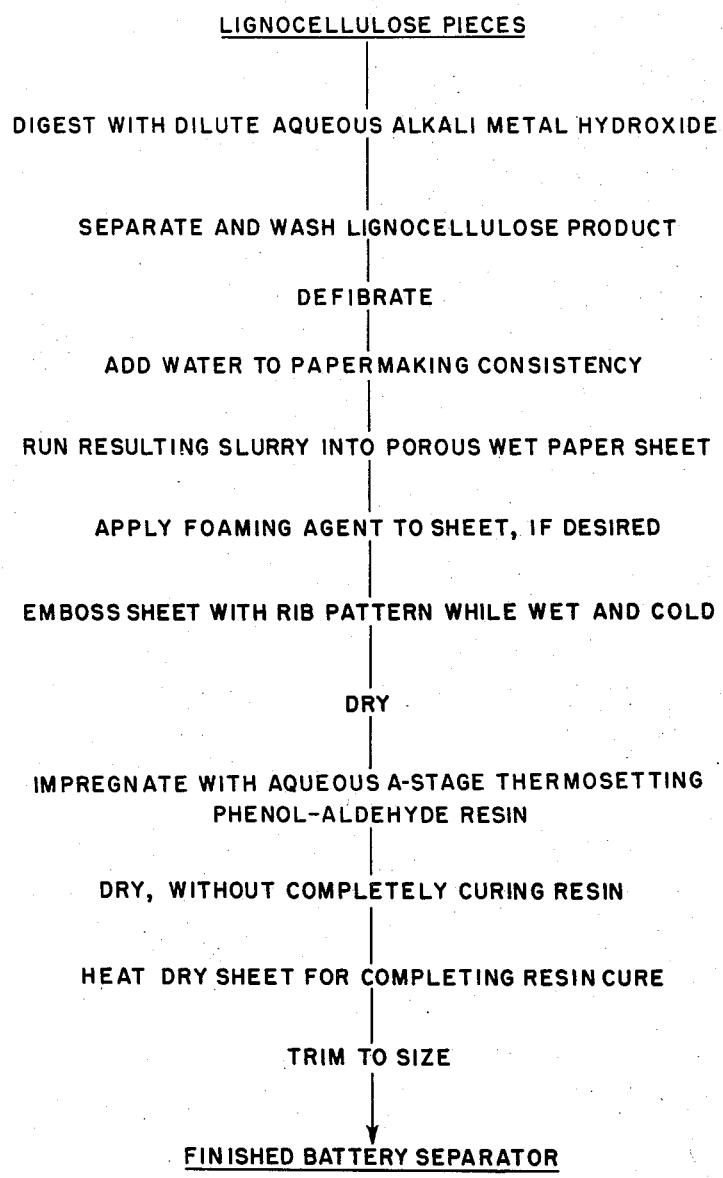
INVENTOR.
PIOTR ZENCZAK
BY
ATTY.

United States Patent Office 2,882,331
Patented Apr. 14, 1959

2,882,331

BATTERY SEPARATOR AND PROCESS OF MAKING THE SAME

Piotr Zenczak, Coos Bay, Oreg., assignor to Evans Products Company, Coos Bay, Oreg., a corporation of Delaware Application December 27, 1955, Serial No. 555,571

19 Claims. (Cl. 136—146)

This invention relates to battery separators of the class employed between the plates of liquid-containing storage batteries for preventing short-circuiting of the battery and dislodging of the chemical materials of which the plates are comprised.

In one prior art process of making battery separators a bibulous, cellulosic, fibrous, base sheet is impregnated with an aqueous solution of a thermosetting phenolic resin. The impregnated sheet then is dried, embossed to form ribs, and heated to cure or set the resin.

The base sheet used in this process conventionally has been made of fibers prepared by the chemical pulping procedures of the paper making industry and as a consequence has contained little or no lignin. In fact, a base sheet containing 90% or more of alpha cellulose and derived from cotton linters has been considered especially suitable for this use.

The foregoing process of making battery separators is attended by several serious disadvantages. Efficient and thorough impregnation of the base sheet with the thermosetting resin is difficult, if not impossible, to obtain without subjecting the impregnated sheet to a laborious squeezing or calendering operation. The resin tends to migrate to the surface of the sheet during drying so that the fibers present in the interior of the sheet are deficient in resin content. During embossing of the impregnated sheet by the application of heated rolls, the fibers are embrittled. As a consequence, the battery separator products are deficient in strength, resistance to battery acid, and electrical properties.

It therefore is the general object of the present invention to provide a battery separator of superior properties, and a process of making such a separator which overcomes the aforementioned problems of manufacture. Also, it is an important object of this invention to provide a process of making a battery separator from lignocellulose, particularly waste wood, which retains in the final product most if not all of the lignin content of the starting material. This results in the production of an improved separator which utilizes to advantage the lignin content of the lignocellulose, the presence of which heretofore has been scrupulously avoided in such products.

As is apparent from the flow plan presented in the drawings, the herein described process of making a novel battery separator generally comprises digesting pieces of wood or other lignocellulose with dilute alkali metal hydroxide. This removes the acids, the water soluble materials and part of the hemicelluloses present in the lignocellulose. The digested lignocellulose is separated from the mother liquor and washed with water. It then is defibrated and water added to form a slurry of paper-making consistency.

This slurry then is run into a porous wet paper sheet to which a wetting agent may be applied if desired. The sheet is embossed with the selected rib pattern while still wet to permit easy fiber rearrangement and form a stable rib pattern, after which it is dried.

Thereafter the dried sheet is impregnated with an aqueous A-stage thermosetting phenol-aldehyde resin and dried under conditions calculated to remove moisture without substantial curing of the resin. The dried sheet then is heated for completing the resin cure, and trimmed to battery separator size.

Although various types of lignocellulose materials including bagasse, corn stalks, and straw may be employed as raw materials in executing the presently described process, it is preferred to use wood. The wood of various tree species, including both the hard woods and soft woods, are suitable. Thus there may be used the woods of the Douglas fir and other firs, the various pines, the cedars, hemlock, and the like. These and other lignocellulose materials may be used in the form of the mill wastes which are obtained in large quantities from the operation of sawmill, veneer plants and woodworking plants.

If the lignocellulose is not already in a reduced form as a result of the manufacturing operation from which it is derived, it is reduced by grinding, chipping, or hogging procedures until it has reached a particle size suitable for digestion with chemical agents.

It then is digested in appropriate equipment with dilute alkali metal hydroxide for the purpose of removing the acids and various water soluble materials which may be present in it and which if permitted to remain would be detrimental to the performance of the battery. Acids thus removed include formic acid and acetic acid. Other materials removed include the tannins, minerals, oils, resins, and the hemicelluloses which hydrolyze readily in battery acid to simple sugars, and to acetic acid.

In carrying out the digestion any of the alkali metal hydroxides, or materials such as their anhydrides or peroxides which when placed in water produce the corresponding alkali metal hydroxides, may be employed. Thus there may be used sodium hydroxide, potassium hydroxide, and the hydroxides of the remaining alkali metals although the latter because of their relative scarcity are not commercially attractive for this use at the present time. These digesting agents, used singly or in admixture with each other, are employed in the form of their aqueous solutions containing from 0.1 to 10% by weight, preferably from 1 to 5% by weight of alkali metal hydroxide.

The conditions of digestion of the lignocellulose with the alkali metal hydroxide are sufficiently severe to result in the desired removal of acids and other extractives, but insufficient to degrade materially the lignocellulose itself. Thus the digestion may be effectuated at a temperature of between 160° F. and the boiling point of the digesting liquor, preferably between 180° F. and 212° F. at normal atmospheric pressure for a time period sufficient to remove the extractive materials to the desired degree. In the average case this requires from 2 to 20 hours, preferably from 6 to 10 hours. Superatmospheric pressure may be employed if it is desired to reduce the digestion time.

Not only does the digestion with dilute alkali metal hydroxide remove certain undesirable principles from the lignocellulose, but it also softens the lignocellulose and makes it readily susceptible to defibration for reduction to a size suitable for paper making. Accordingly the digested material is separated from the digesting liquor and washed with water until it is substantially free from the liquor and substantially neutral in reaction. Thus its pH may be at a value of between 6 and 8.

The separated and washed lignocellulose then may be defibrated in any suitable type of equipment, for example in a Bauer, Asplund, or Allis-Chalmers defibrator. The defibration is carried out to such a degree that a paper-making fibrous product is produced, i.e. one comprised of component fibers which may be felted together in the usual paper-making machines to produce a tough, coherent sheet which is porous and permeable to battery acids. Thus the lignocellulose may be reduced sufficiently to form a slurry having a Schopper-Riegler freeness of from 15–25°, preferably of from 19–23°.

If necessary, water next is added to the defibrated lignocellulose to produce a slurry suitable for running into paper in a paper forming machine. A suitable consistency lies within the broad range of from 0.02 to 3% preferably 0.05 to 0.5%.

The resulting slurry then is run on an Oliver, Fourdrinier or other papermaking machine into a porous paper sheet having a thickness of, for example, 0.01 inch to 0.03 inch, preferably 0.02 inch. Its porosity is such as to allow 14–16 liters of air per minute under a pressure of ½ inch of mercury to pass through an area of 3.14 square inches of the paper. This insures that a product will be provided which is readily impregnable with phenolic resin and which will form a battery separator permeable to battery fluids.

At this stage, or at any other suitable stage in the procedure a foaming agent may be incorporated in the paper. Thus while the sheet is being formed on the Oliver or other forming machine it may be sprayed with the proportion of foaming agent required to make a sheet which is of increased porosity and hence more permeable to liquids. Also, it makes the final separator wet more rapidly when placed in the battery, even without the inclusion of wetting agents of other classes. Examples of suitable foaming agents are the sulfonated derivatives of the lower fatty acids, e.g. the dioctyl ester of sodium sulfosuccinic acid.

Immediately after the sheet has been formed, and while it still contains a substantial amount of water, for example about 8 parts by weight water to 2 parts by weight lignocellulose, it is embossed to imprint upon it the characteristic pattern of spaced apart ribs which normally are provided on battery separators for the purpose of spacing them slightly from the battery plates, and for improving the circulation of the battery fluids.

In contradistinction to the prior art processes, the wet lignocellulosic sheet may be embossed with this pattern while it is still cold and wet. When the sheet is in this condition the component fibers slip over each other readily and may be rearranged easily into the new positions required by the ribbed pattern. As a result, the fibers are not embrittled and a particularly strong durable sheet resistant to cracking is produced. This desirable result obviously is not possible if, as heretofore, the sheet is embossed while it is dry and hot.

After the wet sheet has been embossed with the desired pattern, it is dried to a moisture content of from 0 to 15% by weight, as by passing it through an oven at a temperature of below about 250° F., preferably at a temperature of 160–210° F. The dry sheet then is ready for impregnation with from 10–40% by weight of a thermosetting resin.

Impregnation of the sheet with resin serves several useful functions. It protects the component fibers of the sheet from attack by the acids present in the battery fluid. It makes the separator rigid for easy assembly of the battery. Also, it imparts to the separator a rigid form which is maintained even after the separator has been immersed in the battery acid. As a result, it will not compress in use and the spacing between the battery plates is maintained uniform, preserving efficient circulation of the battery fluid around the plates.

Thermosetting resins to be employed for impregnating the dried paper sheet comprise broadly the thermosetting phenol aldehyde resins. Thus they include the resinous condensation products of phenol, a cresol, xylenol, or a higher phenol with formaldehyde, acetaldehyde, furfural or other aldehydes capable of condensing with a phenol. These various phenol-aldehyde resins may be used singly or in combination with each other. The resin prepared by condensation of phenol itself with formaldehyde is a preferred member of the group for the present purposes.

The thermosetting resins are employed in the form of their aqueous solutions containing for example, from 1 to 50% by weight resin solids, preferably from 5–20% by weight resin solids. As contained in these solutions the resins are in the A-stage, being incompletely polymerized. Accordingly they are well suited for impregnation into the paper base. In general, a resin of the desired degree of advancement will have high dilutibility in water, i.e. minimum dilutibility of 1:8, and low alkalinity, i.e. a pH in the range of 7–9.

To overcome the water resistance imparted to the sheet by the resin, from a trace to 1% of a suitable wetting agent may be added to the sheet with the resin, or independently thereof. Suitable wetting agents to be used for this purpose are those which will not poison the battery, e.g. "Aerosol OT" (the dioctyl ester of sodium sulfosuccinic acid) and the "Tergitols" which are sulfates of the branched chain $C_8$ and higher aliphatic saturated alcohols.

Any suitable technique may be employed for impregnating the paper with resin. In a preferred procedure, the dry sheets are floated across a bath containing a solution of the selected concentration. Floating the sheet in this manner permits the resin solution to be imbibed from its lower surface. Then as the solution rises by capillarity through the sheet air is expelled through the open upper surface. This procedure insures almost instantaneous saturation of the sheet with the resin solution.

After the sheet has been impregnated with resin, it is dried under conditions predetermined to remove moisture but not to materially advance or cure the resin. Accordingly the sheet may be dried by placing it in an oven or by passing it continuously therethrough, at a temperature of below 270° F., preferably at a temperature of between 160–210° F. At the conclusion of this treatment the sheet in a typical instance will have a moisture content of from 1 to 20% by weight.

The sized sheet then is heated at a more elevated temperature for completing the resin cure. Thus it may be heated batchwise or continuously at a temperature of from 280 to 380° F. preferably from 320 to 360° F. It is maintained at this temperature until the resin on the sheet has been cured substantially completely to the insoluble or C-stage.

At the conclusion of the curing operation, the moisture content in a typical case is from 0.5 to 10% by weight. Thereafter the sheet may be subdivided or trimmed to size to provide finished battery separators of the required dimensions.

The advantageous effect of providing a lignocellulose starting material which still retains its content of lignin is amply evident during the impregnating and drying procedures described immediately above. Possibly because of the phenolic character of lignin, the phenolaldehyde resin penetrates the lignocellulose with great speed, and diffuses rapidly through the cell walls present between the molecules of cellulose. It rapidly coats the fibers, penetrates into the lumina of the fibers, is absorbed in the inter-micell spaces, and swells the cellulose itself. Thereupon the fiber is protected from the severe hydrolyzing and oxidizing conditions existing in the battery.

As a consequence of the affinity between the phenolaldehyde resins and the lignin, these effects occur very rapidly so that the sheet may be passed to the next processing step, drying, without interposing a waiting period of as much as two days to provide time for thorough diffusion of the resins into the lignocellulose, as has been required heretofore.

During the drying operation a further advantageous effect stemming from the inclusion of a substantial proportion of lignin in the sheet is evident. Heretofore a base sheet composed predominantly of alpha cellulose had to be dried very slowly to prevent migration of the resin to the surface, leaving the interior fibers of the sheet unduly devoid of resinous content. In the present process, however, since the resin has actually penetrated the cell walls of the fiber, this migration of the resin during drying is very greatly reduced. As a result the sheet can be dried rapidly without danger of starving the central portions thereof with respect to resin.

It is to be noted that embossing the sheet while wet before impregnating it with synthetic resin inherently produces an embossed sheet, the webs of which have a greater density than do the ribs. As a consequence, the ribs absorb as much as 25% by weight more resin than the webs. This leads to the production of a final separator having ribs and adjacent shoulders which are measurably thicker than the webs and which contain substantially more resin.

As a result, the separators have increased resistance to the chemical action of battery acid, and to oxidation of the ribs and shoulders which are in direct contact with the positive plates of the battery. This desirable result is obtained, furthermore, without including a separate rib-coating operation such as is included in conventional prior art battery manufacturing processes wherein the fiber sheet is embossed after impregnation with synthetic resin.

The completed battery separator thus comprises a bibulous, porous sheet of lignocellulosic paper which is readily wetted by and permeable to aqueous solutions, particularly battery acids. The thickness of the sheet is variable, of course, to suit contemplated applications. In general, however, it may be from 0.025 to 0.045, preferably 0.03 inch thick. Its resin content also is variable, but in general it may contain from 5 to 40% by weight resin, dry separator basis. It is eminently suitable for application in the various grades and types of commercial wet storage batteries.

The herein described battery separator and the process of making the same are further illustrated in the following example.

*Example*

Clean, bark-and rot-free Douglas fir chips were screened for removal of fines, sawdust, slivers and oversize chips. 964 pounds of the chips, oven dry basis, then were placed in metal retaining baskets and loaded into a treating vat provided with means for circulating a treating solution.

The chips were flooded with an aqueous 2% by weight solution of sodium hydroxide. The temperature of the system then was raised to 212° F. and maintained at a slow boil for 10 hours. During this period water was added periodically to compensate for evaporation.

After the 10 hour digestion period the treating liquor was drained from the vat and the chips flooded with water. The temperature of the resulting wash bath was elevated to 212° F., which temperature was maintained for 45 minutes. The vat then was drained.

The chips in the vat were subjected to three such washing cycles. They then were given a final wash with circulating water at 130° F. for two hours. At the termination of the final wash cycle, the pH of the wash water was found to be between 7.0 and 10.5. Analysis of the treated chips revealed that the digesting and washing operations had removed 26% of their original content.

After digestion, the chips were ground in a double disc attrition mill under conditions controlled to produce a fiber product of low hydration, i.e. a Schopper-Riegler freeness of about 19–23°, and substantial length. It consisted almost entirely of whole, unruptured wood tracheids, free of fiber bundles and fines.

The fibrous product obtained from the foregoing procedure weighed 714 pounds. It was diluted with water to form a slurry having a consistency of 0.18%. This slurry then was run into paper on a continuous drum filter to form a uniform, mechanically interwoven sheet, the density of which was 15.8 grams per square foot.

A wetting agent solution consisting of 0.25% "Aerosol OT," the dioctyl ester of sodium sulfosuccinic acid, in water was sprayed on the sheet immediately after its formation. The rate of application was 125 milliliters per square foot. This was found to improve the draining qualities of the sheet and to increase its air permeability and wettability.

The sheet then was carried on a continuous fixed belt over a smooth steel roll directly under a cold steel compressing-embossing roll. The design on these rolls was such as to form the permanent rib and shoulder construction desired in the finished separator. The compressing-embossing operation compressed the web sufficiently to produce a sheet having a thickness of 0.02 inch after drying.

During the embossing operation the sheet contained about 80% by weight water. It therefore was fluid and exhibited very little fiber tearing or disorienting where the ribs were formed. Hence strength reduction caused by embossing was obviated. Water squeeze out during embossing reduced the water content of the sheet to 233% of the dry weight of the sheet.

After embossing, the sheet was passed between two smooth, cooperating, steel leveling rolls. The gap between these rolls was adjusted to reduce the rib and shoulder height on the sheet sufficiently to attain the desired overall thickness.

The formed, embossed and leveled sheet was passed into an oven maintained at 220° F. where it was retained for 14 minutes. At the end of this time the sheet was substantially free of water. It was uniform in average density, mechanical bonding, porosity and thickness. It was 0.02 inch thick at the webs and had a dry tensile strength, machine direction of 800 p.s.i. In addition, it was highly permeable, allowing 14 to 16 liters of air per minute under a pressure of ½ inch of mercury to pass through an area of 2.14 square inches. Because of the mild drying conditions employed, it exhibited very little cockling or wrinkling.

The dried sheet was carried by means of rolls into an impregnating solution of an A-stage thermosetting phenol-formaldehyde resin containing ⅛ of 1% of a wetting agent, based on the total weight of the aqueous solution. The resin employed was a low molecular type phenol formaldehyde resin sold under the trademark "Amrez 8015" by the American Marietta Company. The wetting agent was Aerosol OT.

The sheet was retained in the impregnating tank for ½ minute. It then was carried, fully saturated, by means of another series of rolls and screens into a drying oven. At this stage the sheet contained 75% by weight water, based on the weight of the wet sheet including the resin. The sheet was dried 16 minutes at 210° F.

The resulting moisture free sheet was passed through a curing oven maintained at 345° F. It was maintained therein for 4½ minutes during which time the resin was substantially completely cured to the C-stage and rendered insoluble in water or sulfuric acid. The cured sheet then was slit and clipped to separator size.

The finished separators wetted instantaneously in 1.050 or 1.250 specific gravity sulfuric acid. They had a tensile strength of 1200 p.s.i. when dry and 900 p.s.i. after complete wetting. The web was .033 inch thick and the sheet density was 23.6 grams per square foot. The separators contained 33% resin solids and 0.2% wetting agent solids based on the total separator weight.

The separators were air permeable to the extent of allowing 14 to 16 liters of air under pressure of ½ inch mercury to flow per minute through an area of 3.14 square inches. Impregnation with thermosetting resins thus did not increase greatly the air permeability of the original unimpregnated sheet.

The separators were extremely resistant to acid, retaining 65 to 70% of their original tensile strength after treatment with 1.25 specific gravity sulfuric acid at 150° F. for 24 hours, and 55 to 60% of their original tensile strength after subjection to the same treatment for 100 hours.

The separators also were highly resistant to abrasion. Their electrical resistance was sufficiently low to allow batteries made from them to attain a voltage of 4.40 after 5 seconds discharge at 300 amps. starting at 0° F. temperature. They thus were fully equivalent in their performance to other commercial separators, despite the fact that they were made from waste wood and contained a high proportion of lignin.

Having thus described my invention in preferred embodiments, I claim:

1. A battery separator material comprising a porous sheet of bibulous lignocellulosic paper, the paper containing a major proportion of the lignin content but being substantially free from the content of hemicelluloses, resin acids and water soluble materials contained in the lignocellulose from which it is derived, and a paper-rigidifying amount of a thermosetting phenol-aldehyde resin diffused throughout the sheet.

2. A battery separator comprising a porous sheet of bibulous lignocellulose paper embossed with a pattern of ribs and webs and containing a major proportion of the lignin content but being substantially free from the hemicellulose content, resin acid content and water-soluble content of the lignocellulose from which it is derived; and from 10–40% by weight, dry sheet basis, of thermosetting phenol-aldehyde resin solids diffused into the lignocellulose fiber, the concentration of resin being greater in the ribs than in the webs of the sheet.

3. The battery separator material of clam 1 wherein the lignocellulosic paper comprises a paper made from wood and contains substantially the native lignin content of the wood from which it is derived, and having a thickness in the range of 0.025 to about 0.033 inch.

4. The battery separator material of claim 1 wherein the sheet contains from 10–40% of phenol-aldehyde resin, solids basis.

5. The battery separator material of claim 1 wherein the phenol-aldehyde resin comprises a low molecular type phenol-formaldehyde resin which is capable of penetrating and swelling the fibers of said paper.

6. A battery separator comprising a porous sheet of bibulous lignocellulosic paper, the paper containing a major proportion of the lignin content but being substantially free from the content of hemicelluloses, resin acids and water soluble material contained in the lignocellulose from which it is derived, and a paper-rigidifying amount of a thermoset phenol-aldehyde resin diffused throughout the sheet.

7. The process of making a battery separator which comprises digesting pieces of lignocellulose with a dilute aqueous solution of an alkali metal hydroxide for solution of a substantial proportion of the resin acids, hemicelluloses and water-soluble content of the lignocellulose without substantial solution of the lignin content thereof, separating the digested lignocellulose from the residual liquor and washing it for removal of the dissolved resin acids, hemicelluloses and water-soluble content, defibrating the digested and washed lignocellulose, forming an aqueous slurry from the defibrated lignocellulose, forming a porous wet paper sheet from the slurry, embossing the sheet, impregnating the embossed sheet with an aqueous A-stage thermosetting phenol-aldehyde resin and drying and curing the resulting sheet.

8. The process of claim 7 wherein the lignocellulose pieces are digested with an aqueous solution of sodium hydroxide having a concentration of from 0.1 to 10% by weight sodium hydroxide, at a temperature of from 160° F. to the boiling point of the solution for a time of from 2 to 20 hours.

9. The process of claim 7 wherein the lignocellulose pieces are digested with an aqueous solution of sodium hydroxide containing from 1 to 5% by weight sodium hydroxide at a temperature of from 180 to 212° F. and at substantially atmospheric pressure for a time of from 6 to 10 hours.

10. The process of claim 7 wherein the digested and washed lignocellulose pieces are defibrated to a product having a Schopper-Riegler freeness of from 15–25°.

11. The process of claim 7 wherein the digested and washed lignocellulose pieces are defibrated to a product having a Schopper-Riegler freeness of from 19–23°.

12. The process of claim 7 wherein the consistency of the slurry is from 0.05 to 0.5%.

13. The process of claim 7 wherein the consistency of the slurry is from 0.02 to 3%.

14. The process of claim 7 wherein the sheet is impregnated with an aqueous solution of A-stage thermosetting phenol-aldeyhde resin, having a concentration of 1–50% resin until the sheet contains from 10–40% by weight dry basis of resin solids.

15. The process of claim 7 wherein the sheet is impregnated with an aqueous solution of A-stage thermosetting phenol-aldehyde resin, having a concentration of 5–20% resin until the sheet contains from 10–40% by weight dry basis of resin solids.

16. The process of claim 7 wherein the impregnated sheet is dried at a temperature of below 270° F. until substantially dry and thereafter heated at 280–380° F. until the resin content of the sheet is cured substantially completely.

17. The process of claim 7 wherein the impregnated sheet is dried at a temperature of 160–210° F. until substantially dry and thereafter heated at 320–360° F. until the resin content of the sheet is cured substantially completely.

18. The process of making battery separators which comprises digesting wood pieces with dilute aqueous alkali metal hydroxide having a concentration of from 0.1 to 10% by weight at a temperature of from 160° F. to the boiling point of the liquor at ambient pressure for a time of from 2–20 hours, separating and washing the resulting lignocellulose product, defibrating the digested and washed lignocellulose product to a Schopper-Riegler freeness of from 15–25°, adding water to the defibrated product to form a slurry having a consistency of from 0.02 to 3% by weight, running the resulting slurry into a porous wet paper sheet, embossing the sheet while wet, drying the embossed sheet, impregnating the embossed sheet with an aqueous A-stage thermosetting phenol aldehyde resin having a minimum dilutibility with water of 1:8, drying the sheet at a temperature of below 270° F. until it is substantially dry, but without completely curing the resin, and heating the dry sheet at a temperature of from 280–380° F. until the resin is cured substantially completely.

19. The process of making battery separators which comprises digesting wood pieces with dilute aqueous alkali metal hydroxide having a concentration of from 1–5% by weight at a temperature of from 180–212° F. for a time of from 6–10 hours, separating and washing the resulting lignocellulose product, defibrating the digested and washed lignocellulose product to a Schopper-Riegler freeness of from 19–23°, adding water to the defibrated product to form a slurry having a consistency of from 0.05 to 0.5% by weight, running the resulting slurry into a porous wet paper sheet, embossing the sheet while wet, drying the embossed sheet, impregnating the embossed sheet with an aqueous A-stage thermosetting phenol-aldehyde resin in the form of a 1–50% by weight aqueous solution until the sheet contains from 10–40% by weight resin solids, dry sheet basis, drying the sheet until it is substantially dry, but without completely curing the resin, and heating the dry sheet at a temperature of from 280–380° F. until the resin is cured substantially completely.

References Cited in the file of this patent

UNITED STATES PATENTS

| | | |
|---|---|---|
| 2,508,043 | Schaefer | May 16, 1950 |
| 2,543,137 | Uber | Feb. 27, 1951 |
| 2,662,107 | Uhlig et al. | Dec. 8, 1953 |
| 2,678,961 | Uhlig et al. | May 18, 1954 |
| 2,683,400 | Booth | July 13, 1954 |
| 2,687,445 | Merrill | Aug. 24, 1954 |